Patented Jan. 25, 1938

2,106,599

UNITED STATES PATENT OFFICE 2,106,599

MATERIAL IMPERMEABLE TO ULTRA-VIOLET RAYS AND PROCESS FOR PRODUCTION THEREOF

Otto Gerngross, Yeni-Sehire, Turkey, and Alexander Callo, Bomhild, Germany

No Drawing. Application March 4, 1936, Serial No. 67,088. In Germany February 20, 1933

12 Claims. (Cl. 91—68)

It is known that ultra-violet rays produce considerable decomposition, discolouring and like effects on goods of various natures, such as textiles, foodstuffs, paper articles, chemicals and the like, and prematurely spoil these goods. In order to obviate this drawback, the light-permeable wrapping paper used has been provided with a coloured substance, chiefly red dyestuff, in order to prevent the harmful action of the sun's rays. This method has the drawback that the papers or foils become less transparent and can only be used to a limited extent for wrapping articles.

It has also already been proposed to add to the wrapping paper esculine, cumarin derivatives, such as umbelliferone, methyl umbelliferone and the like, but such substances only exert a protecting action in an alkaline solution and not in a neutral solution, so that the papers saturated with these substances either act in a very strong alkaline manner and then rapidly turn yellow and are destroyed, or if the alkalinity be small very soon lose their protecting properties owing to the carbon dioxide in the air. Furthermore, for reasons of hygiene it is unsuitable, particularly for wrapping foodstuffs, to permeate paper or cellulose derivative foils with the aforesaid substances, as these are not permanently bound to the cellulose or the cellulose fibre, being dissolved out by traces of moisture and considerably adulterating the wrapped articles, since the latter frequently contain a considerable quantity of water. Furthermore, for rendering wrappings impermeable to ultra-violet rays, it has been proposed to saturate them with various other organic compounds, such as anthracene and triphenyl methane. These, however, have the drawback that they are insoluble in water and therefore require relatively expensive organic solvents for their solution.

All these drawbacks are obviated by the present invention.

According to the invention, transparent or translucent papers, cellulose hydrate or cellulose derivative foils or like substances are saturated with an extract from pine bark or quebracho freed from colouring and tanning constituents. In this way, a material is obtained which is practically impermeable to ultra-violet rays. It is of particular importance that the said substances are irreversibly incorporated in the paper and cannot be dissolved out by water.

It has also been found that when saturated with a suitable mixture of pine bark extract and quebracho extract, the material assumes a white fluorescence, whereby when wrapping dark-coloured articles a better transparency unhindered by coloured fluorescence is obtained. The correct mixing proportions depend on the concentration of the two extracts and may easily be ascertained by tests, as the fluorescence becomes yellow when there is a surplus of quebracho extract and violet in the presence of a surplus of pine bark extract.

In carrying out the invention, for example, a cellulose ester—such as acetyl cellulose foil—is saturated with an aqueous solution of pine bark extract and/or quebracho extract, whereupon washing out takes place until the colouring constituents and tanning substances are completely eliminated. In cases where the subsequent saturation of the finished papers is not possible, for example in the case of parchment-like papers, the extract solution can be added to the paper material in the beating engine.

The material treated according to the invention is completely neutral after drying. The quantities to be added depend on the desired degree of impermeability and are so small that in practice no increase of the cost of the paper and of the foils occurs.

The foils produced according to the present process may also be used for photographic purposes, and in particular as filters for photography with ultra-violet rays. It is also possible to provide protective goggles for high mountainous districts or for various trades with such foils.

It is already known, for producing artificial leather, to saturate a porous fabric of cellulose fibres with rubber and after drying to treat them with quebracho or similar extracts, which are intended to produce a better precipitation of the rubber particles and to assimilate the properties of colour and odour of the leather to the corresponding properties of natural leather. With artificial leather, however, there is no question, as in the case of the present invention, of a transparent or translucent material.

What we claim and desire to secure by Letters Patent of the United States is:—

1. As a new product of manufacture a translucent material of the cellulosehydrate or the cellulose derivative type for instance translucent paper rendered impermeable to ultra-violet rays by incorporation therein of an aqueous pine bark extract and being freed before drying from the coloring and tanning constituents of the same by thorough washing of pine bark extract therein.

2. As a new product of manufacture a translucent material of the cellulosehydrate or the cellulose derivative type for instance translucent paper rendered impermeable to ultra-violet rays by incorporation therein of an aqueous quebracho extract and being freed before drying from the coloring and tanning constituents of the same by thorough washing of the quebracho extract therein.

3. As a new product of manufacture a translucent material of the cellulosehydrate or the cellulose derivative type for instance translucent paper rendered impermeable to ultra-violet rays by incorporation therein of an aqueous pine bark and quebracho extract and being freed before drying from the coloring and tanning constituents of the same by thorough washing of quebracho extract, and of pine bark extract therein.

4. The process for rendering translucent materials of the cellulose hydrate or the cellulose derivative type for instance translucent paper impervious to ultra-violet light comprising the steps of saturating the same with an aqueous, diluted extract of pine bark, thoroughly washing the saturated product with water until the coloring and tanning constituents are removed and drying the washed products.

5. The process for rendering translucent materials of the cellulose hydrate or the cellulose derivative type for instance translucent paper impervious to ultra-violet light comprising the steps of saturating the same with an aqueous, diluted extract of quebracho, thoroughly washing the saturated product with water until the coloring and tanning constituents are removed and drying the washed product.

6. The process for rendering translucent materials, of the cellulose hydrate or the cellulose derivative type for instance translucent paper impervious to ultra-violet light comprising the steps of saturating the same with a mixture of an aqueous, diluted extract of pine bark and of quebracho, thoroughly washing the saturated product with water until the coloring and tanning constituents are removed and drying the washed product.

7. The process according to claim 4, consisting in washing the saturated product up to neutrality.

8. The process according to claim 5, consisting in washing the saturated product up to neutrality.

9. The process according to claim 6, consisting in washing the saturated product up to neutrality.

10. The process for rendering translucent materials of the cellulose hydrate or the cellulose derivative type for instance translucent paper impervious to ultra-violet light comprising the steps of diluting a concentrated, aqueous extract of pine bark with water to a proportion of about 1:100, treating the materials by saturation with this solution for a time of about 30 seconds, washing the saturated product with water until the coloring and tanning constituents are removed and drying the washed product.

11. The process for rendering translucent materials of the cellulose hydrate or the cellulose derivative type for instance translucent paper impervious to ultra-violet light comprising the steps of diluting a concentrated, aqueous extract of quebracho with water to a proportion of about 1:200, treating the materials by saturation with this solution for a period of about 30 seconds, washing the saturated product with water until the coloring and tanning constituents are removed and drying the washed product.

12. The process for rendering translucent materials of the cellulose hydrate or the cellulose derivative type for instance translucent paper impervious to ultra-violet light comprising the steps of diluting a concentrated aqueous extract of pine bark and quebracho with water to a proportion of about 1:150, treating the materials by saturation with this solution for a period of about 30 seconds, washing the saturated product with water until the coloring and tanning constituents are removed and drying the washed products.

OTTO GERNGROSS.
ALEXANDER CALLO.